US011510136B2

United States Patent
Kvernvik et al.

(10) Patent No.: US 11,510,136 B2
(45) Date of Patent: Nov. 22, 2022

(54) METHODS AND APPARATUS FOR ROAMING BETWEEN WIRELESS COMMUNICATIONS NETWORKS

(71) Applicant: Telefonaktiebolaget LM Ericsson (publ), Stockholm (SE)

(72) Inventors: Tor Kvernvik, Täby (SE); Martin Isaksson, Stockholm (SE); Hjalmar Olsson, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 179 days.

(21) Appl. No.: 16/959,051

(22) PCT Filed: Jan. 12, 2018

(86) PCT No.: PCT/SE2018/050025
§ 371 (c)(1),
(2) Date: Jun. 29, 2020

(87) PCT Pub. No.: WO2019/139510
PCT Pub. Date: Jul. 18, 2019

(65) Prior Publication Data
US 2020/0344682 A1    Oct. 29, 2020

(51) Int. Cl.
*H04W 48/00* (2009.01)
*H04W 48/18* (2009.01)
(Continued)

(52) U.S. Cl.
CPC .............. *H04W 48/18* (2013.01); *G06N 3/08* (2013.01); *H04W 40/12* (2013.01)

(58) Field of Classification Search
CPC ......... H04W 48/18; H04W 40/12; G06N 3/08
See application file for complete search history.

(56) References Cited

U.S. PATENT DOCUMENTS

2012/0108206 A1    5/2012  Haggerty
2016/0112927 A1    4/2016  Cui et al.
(Continued)

FOREIGN PATENT DOCUMENTS

CN    103327556 A  *  9/2013
EP    3761234 A1  *  1/2021  ............. A63F 13/67
(Continued)

OTHER PUBLICATIONS

International Search Report and the Written Opinion of the International Searching Authority, issued in corresponding International Application No. PCT/SE2018/050025, dated Jun. 6, 2018, 13 pages.

*Primary Examiner* — Khai M Nguyen
(74) *Attorney, Agent, or Firm* — Rothwell, Figg, Ernst & Manbeck, P.C.

(57) ABSTRACT

A method performed by a first wireless device served by a first wireless access point in a first wireless communications network, the first wireless communications network being operated by a first network operator, comprises acquiring (202) a determination from a first reinforcement learning agent of whether to roam from the first wireless access point to a second wireless access point in a second wireless communications network, the second wireless communications network being operated by a second network operator. The method further includes roaming (204) from the first wireless access point to the second wireless access point, based on the determination.

17 Claims, 12 Drawing Sheets

800

Allocate a reward to a first reinforcement learning agent based on an action determined by the first reinforcement learning agent, the action comprising providing an instruction to a first wireless device served by a first wireless access point in a first wireless communications network, the instruction instructing the first wireless device to roam from the first wireless access point to a second wireless access point in a second wireless communications network  — 802

(51) Int. Cl.
*G06N 3/08* (2006.01)
*H04W 40/12* (2009.01)

(56) References Cited

U.S. PATENT DOCUMENTS

| 2018/0164756 A1* | 6/2018 | Yamaguchi | ............ G05B 19/18 |
| 2019/0047143 A1* | 2/2019 | Matsudaira | ............ B25J 13/085 |

FOREIGN PATENT DOCUMENTS

| WO | 2012073059 A1 | 6/2012 | | |
| WO | WO-2012073059 A1 * | 6/2012 | ............ | H04W 48/18 |
| WO | 2015157933 A1 | 10/2015 | | |

* cited by examiner

800

Allocate a reward to a first reinforcement learning agent based on an action determined by the first reinforcement learning agent, the action comprising providing an instruction to a first wireless device served by a first wireless access point in a first wireless communications network, the instruction instructing the first wireless device to roam from the first wireless access point to a second wireless access point in a second wireless communications network — 802

Fig. 8

METHODS AND APPARATUS FOR ROAMING BETWEEN WIRELESS COMMUNICATIONS NETWORKS

CROSS REFERENCE TO RELATED APPLICATION(S)

This application is a 35 U.S.C. § 371 National Phase Entry Application from PCT/SE2018/050025, filed Jan. 12, 2018, designating the United States, the disclosure of which is incorporated herein by reference in its entirety.

TECHNICAL FIELD

Embodiments herein relate to methods and devices in a wireless communications network. More particularly but non-exclusively, embodiments herein relate to the use of reinforcement learning agents when roaming between wireless communications networks.

BACKGROUND

This disclosure generally relates to roaming in wireless communications networks. Connectivity is crucial for many mobile devices yet many geographical areas have limited or even no connectivity (e.g. connectivity black spots or "black holes"). Internet of Things (IoT) devices may require reliable connectivity, possibly all the time. Generally, connectivity may vary between different wireless communications networks (that may be run by different operators) and geographical areas. For example, a wireless communications network run by operator A may provide better connectivity at location A than a wireless communications network run by operator B or vice versa.

Moving wireless devices present an additional challenge. In order to maximize the connectivity for moving users there may be a need to roam (e.g. transfer service) between wireless communications networks. There may be a cost associated with roaming. For example, this may comprise a temporary reduction of connectivity as service is transferred, or a monetary cost associated with transferring service to the new wireless communications network.

There may also be a need to roam when, for example, a stationary device is impacted by traffic load, weather conditions or configuration changes in an operator's network.

Currently, few markets support national roaming. For example, wireless devices may be provided with modems having multiple SIM cards, each SIM card being associated with a different wireless communication network. Roaming between operators may typically be performed by vendor (e.g. operator) specific methods. For example, roaming may be controlled manually by the user or controlled by software in the modems. Such software solutions may be vendor specific and based on hard-coded criteria (e.g. "switch between operators when the connectivity is beyond a threshold"). Roaming between operators may also be device-vendor specific, for example, a modem may comprise more than one SIM card. In such a scenario, the modem may determine when to switch between subscriptions (e.g. using vendor-specific methods) without any input from a network operator.

When a decision is taken to roam between two wireless communications networks, there are several methods to enforce the roaming, as follows.

eSIM roaming (also known as soft SIM or embedded universal integrated-circuit card, eUICC) is a secure element designed to remotely manage multiple mobile network operator subscriptions and be compliant with Global System Mobile Association (GSMA) specifications.

This makes it possible to remotely change wireless communications network (e.g. network operator) by alternating between them e.g. moving from one operator to the other without changing SIM card. The wireless communications network profile is changed on the device without being recognized by the device.

The functionality of an embedded SIM may be the same as a traditional SIM, but a provisioning profile is assigned during manufacturing that allows a Subscription Manager to download and manage 'operational profiles' on the eUICC. For example, the subscription manager may manage profiles PF-A and PF-B, e.g. profiles for wireless communications networks run by operators A and B respectively.

In national roaming, a wireless device roams between operators in the same country. The subscriber has a Home Public Land Mobile Network (HPLMN) but can roam to other wireless communications networks, described as Visited Public Land Mobile Networks (VPLMNs). In this way, a wireless device may thereby temporarily switch between different mobile networks using a single subscription. Charging and authentication is handled by the HPLMN.

In multiple modems roaming, a wireless device (such as a machine to machine (M2M) device) has multiple modems that can be switched between when the user wants to change wireless communications network. The switch may be controlled by a subscription manager. In multiple modems roaming, separate modems and subscriptions are required.

SUMMARY

As described above, maintaining connectivity of a moving wireless device may present a challenge, particularly if the wireless device moves through geographic regions served by different wireless communications networks that may have varying connectivity. In order to maximize the connectivity for moving users there may be a need to roam (e.g. transfer service) between wireless communications networks. There may be a cost associated with roaming. For example, this may comprise a temporary reduction of connectivity as service is transferred, or a monetary cost associated with transferring service to the new wireless communications network. It may therefore be challenging to optimize the connectivity for a moving wireless device whilst at the same time, avoid unnecessary roaming. The solutions presented herein address this problem, amongst others.

According to a first aspect, there is provided a method performed by a first wireless device, the first wireless device being served by a first wireless access point in a first wireless communications network, the first wireless communications network being operated by a first network operator. The method comprises acquiring a determination from a first reinforcement learning agent of whether to roam from the first wireless access point to a second wireless access point in a second wireless communications network, the second wireless communications network being operated by a second network operator, and roaming from the first wireless access point to the second wireless access point, based on the determination.

The use of reinforcement learning agents, as described in the methods herein, allow dynamic decisions to be made as to whether to roam, based on insights gained from previous decisions (e.g. actions) performed by the reinforcement learning agent. According to some embodiments herein, reinforcement learning agents may be used to optimize connectivity for a moving wireless device whilst at the same time, avoid unnecessary roaming.

According to a second aspect there is provided a method performed by a node of a wireless communications network. The method comprises acquiring a determination from a first reinforcement learning agent of whether a first wireless device served by a first wireless access point in a first wireless communications network operated by a first network operator should roam from the first wireless access point to a second wireless access point in a second wireless communications network operated by a second network operator. The method further comprises instructing the first wireless device to roam from the first wireless access point to the second wireless access point, based on the determination.

According to a third aspect there is provided a method performed by a node of a wireless communications network. The method comprises allocating a parameter indicative of a reward to a first reinforcement learning agent based on an action determined by the first reinforcement learning agent, the action comprising providing an instruction to a first wireless device served by a first wireless access point in a first wireless communications network operated by a first network operator, the instruction instructing the first wireless device to roam from the first wireless access point to a second wireless access point in a second wireless communications network operated by a second network operator.

According to a fourth aspect there is provided a computer program comprising instructions which, when executed on at least one processor, cause the at least one processor to carry out one of the methods above.

According to a fifth aspect there is provided a computer program product comprising a computer-readable medium with the computer program above.

According to a sixth aspect there is provided a first wireless device. The first wireless device is connected to a first wireless access point in a first wireless communications network, the first wireless communications network being operated by a first network operator. The first wireless device comprises a processor and a memory. The memory contains instructions executable by the processor. The first wireless device is operative to acquire a determination from a first reinforcement learning agent of whether to roam from the first wireless access point to a second wireless access point in a second wireless communications network, the second wireless communications network being operated by a second network operator. The first wireless device is further operative to roam from the first wireless access point to the second wireless access point, based on the determination.

According to a seventh aspect, there is provided a node in a wireless communications network. The node comprises a processor and a memory. The memory contains instructions executable by the processor. The node is operative to acquire a determination from a first reinforcement learning agent of whether a first wireless device served by a first wireless access point in a first wireless communications network operated by a first network operator should roam from the first wireless access point to a second wireless access point in a second wireless communications network operated by a second network operator. The node is further operative to instruct the first wireless device to roam from the first wireless access point to the second wireless access point, based on the determination.

According to an eighth aspect there is provided a node in a wireless communications network. The node comprises a processor and a memory. The memory contains instructions executable by the processor. The node is operative to allocate a parameter indicative of a reward to a first reinforcement learning agent based on an action determined by the first reinforcement learning agent, the action comprising providing an instruction to a first wireless device served by a first wireless access point in a first wireless communications network operated by a first network operator, the instruction instructing the first wireless device to roam from the first wireless access point to a second wireless access point in a second wireless communications network operated by a second network operator.

BRIEF DESCRIPTION OF THE DRAWINGS

FIG. 8 shows an example method performed by a node of a wireless communications network according to some embodiments;

DESCRIPTION OF EMBODIMENTS

As noted above, it may be challenging to optimize connectivity for a moving wireless device whilst at the same time, avoid unnecessary roaming that may incur costs (e.g. temporary connectivity issues and/or monetary costs).

Figure 1:
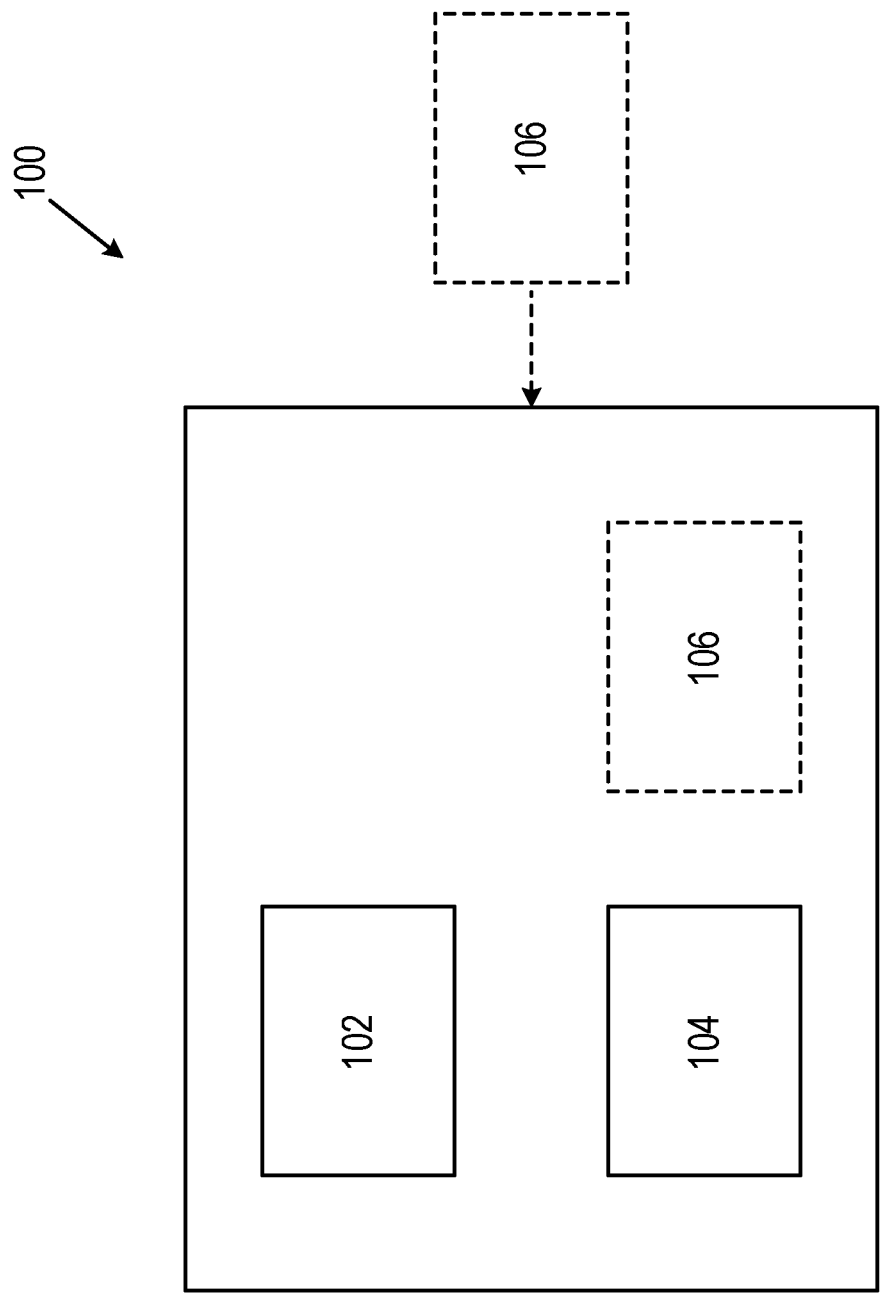
FIG. 1 shows an example first wireless device according to an embodiment.

FIG. 1 shows a first wireless device 100 according to some embodiments herein. The first wireless device 100 is connected to a first wireless access point in a first wireless communications network. The first wireless communications network is operated by a first network operator. The first wireless device 100 comprises a processor 102 and a memory 104. The memory 104 contains instructions executable by the processor 102. The first wireless device 100 may be operative to perform the methods described herein. For example, in some embodiments, the instructions when executed by the processor 102 may cause the processor 102 to perform the methods described herein.

The memory 104 may be configured to store instructions in the form of program code that can be executed by the processor 102 to perform the method described herein. In some implementations, the instructions can comprise a plurality of software and/or hardware modules that are each configured to perform, or are for performing, individual or multiple steps of the method described herein. In some embodiments, the memory 104 may be part of a device that also comprises one or more other components of the first wireless device 100 (for example, the processor 102 and/or one or more other components of the first wireless device 104). In alternative embodiments, the memory 104 may be part of a separate device to the other components of the first wireless device 100.

The processor 102 of the first wireless device 100 can be configured to communicate with the memory 104 to execute the instructions. The processor 102 can comprise one or more processors, processing units, multi-core processors or modules that are configured or programmed to control the first wireless device 100 in the manner described herein. In some implementations, for example, the processor 102 may comprise a plurality of processors, processing units, multi-core processors and/or modules configured for distributed processing. It will be appreciated by a person skilled in the art that such processors, processing units, multi-core processors and/or modules may be located in different locations and may each perform different steps and/or different parts of a single step of the method described herein.

Briefly, as will be described in more detail below, the first wireless device 100 is operative to (e.g. adapted to) acquire a determination from a first reinforcement learning agent 106 of whether to roam from the first wireless access point in the first wireless communications network (operated by the first network operator) to a second wireless access point in a second wireless communications network, the second wireless communications network being operated by a second network operator, and roam from the first wireless access point to the second wireless access point, based on the determination.

As noted above, the use of reinforcement learning agents to determine whether to roam may allow for improved decision making in a moving device. For example, the first reinforcement learning agent 106 may improve connectivity of a wireless device when the wireless device moves between areas of varying connectivity. As will be explained in more detail below, the first reinforcement learning agent may be configured to make determinations such that a wireless device may be served by the wireless communications network having an appropriate connectivity (e.g. a connection of appropriate quality or speed), whilst at the same time avoiding unnecessary roaming. Use of a reinforcement learning agent allows decisions to be updated (e.g. through learning and updating a model associated with the first reinforcement learning agent) dynamically as the environment changes, based on previous decisions (or actions) performed by the first reinforcement learning agent. This means that as new cells (or wireless access points) are added or existing cells change or are updated, the decision making process may be automatically updated with no human intervention. This may ensure that optimal connectivity is achieved with minimal roaming, even under changing conditions.

The skilled person will be familiar with reinforcement learning and reinforcement learning agents. However, briefly, reinforcement learning is a type of machine learning process whereby a reinforcement learning agent (e.g. algorithm) is used to take decisions (e.g. perform actions) on a system to adjust the system according to an objective (which may, for example, comprise moving the system towards an optimal or preferred state of the system). The reinforcement learning agent receives a reward based on whether the action changes the system in compliance with the objective (e.g. towards the preferred state), or against the objective (e.g. further away from the preferred state). The reinforcement learning agent therefore adjusts parameters in the system with the goal of maximising the rewards received.

Put more formally, a reinforcement learning agent receives an observation from the environment in state S and selects an action to maximize the expected future reward r. Based on the expected future rewards, a value function V for each state can be calculated and an optimal policy π hat maximizes the long term value function can be derived.

In the context of this disclosure, the first wireless device and its surroundings (e.g. the system that the first wireless device is within) comprises the "environment" in the state S. The state may comprise the location and/or direction of travel of the first wireless device that may be derived from current and past information about the first wireless device (for example, information indicative of a location of the first wireless device, such as geographical co-ordinates of the first wireless device and/or location information related to the first wireless access point that is currently serving the first wireless device such as a cell ID) and/or information about the first or second wireless access points (for example, information indicative of the connectivity of the first or second wireless access points, such as information about the quality of the connection). "Actions" performed by the reinforcement learning agents comprise the decisions or determinations made by the reinforcement agents as to whether a wireless device should roam from a first wireless access point to a second wireless access point. Generally, the reinforcement learning agents herein receive feedback in the form of a reward or credit assignment every time they make a determination (e.g. every time they instigate an action). A reward is allocated depending on the goal of the system. For example, and as will be discussed in detail below, rewards may be allocated according to whether decisions (e.g. actions) result in roaming and/or whether decisions result in improved or reduced connectivity. The relative sizes and signs (e.g. whether a numerical value of, or associated with, a reward is positive or negative) of a reward may be tuned so as to optimise connectivity whilst reducing roaming. As noted above, generally, the goal of the reinforcement learning agents herein is to maximise the reward received.

The first reinforcement learning agent 106 may make decisions (e.g. perform actions) based on any reinforcement learning method, such as, for example, a Q-learning method, an actor-critic method, a Sarsa (on-policy TD control) method, a deep Q-learning (DQN) method or a Multi Armed Bandit method. In some embodiments, the first reinforcement learning agent may employ a Markov decision making process.

Generally, as will be described in more detail below, in some embodiments, the first reinforcement learning agent 106 may be local to the first wireless device 100 (e.g. the first reinforcement learning agent 106 may be located on or comprised in the wireless device 100) as optionally illustrated in FIG. 1. In some embodiments, the first reinforcement learning agent 106 may be located remotely to the first wireless device 100 (as optionally illustrated in FIG. 1). For example, the first reinforcement learning agent 106 may be hosted remotely on a server and the first wireless device may be operable to acquire the determination by querying the first reinforcement learning agent 106 on the server.

Turning back to the first wireless device 100, the first wireless device may comprise a device capable, configured, arranged and/or operable to communicate wirelessly with network nodes and/or other wireless devices. Unless otherwise noted, the term wireless device (WD) may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a Machine-Type-Communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.), personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

In some embodiments, a first wireless access point serves a cell or hotspot in the first wireless communications network. The first wireless access point can also use beamforming. In some embodiments, the first wireless communications network is operated by a first network operator and the second wireless communications network is operated by a second network operator. In some embodiments, the first wireless communications network and/or the second wireless communications network comprises a Public Land Mobile Network (PLMN). Generally, the first wireless communications network may be configured to provide wireless service according to any wireless access protocols, such as: Global System for Mobile Communications (GSM), Wideband Code Division Multiple Access (WCDMA), Long Term Evolution (LTE), New Radio (NR), WiFi, or Bluetooth wireless technologies or any future developments to these protocols. The skilled person will appreciate that these are merely examples and that the wireless communications network may be configured to provide wireless service according to other suitable protocols.

The first wireless device is (initially) served by the first wireless access point. In this sense, being served by may comprise the first wireless device being connected to the first wireless access point. The first wireless device may be connected to the first wireless access point in any state, for example the first wireless device may be connected (e.g. actively sending data) or idle (still served by, but not sending data).

It will be appreciated that in some embodiments, the first wireless device may comprise additional components to those shown in FIG. 1. For example, first wireless device 100 may further comprise an interface capable of (e.g. adapted to, operative to, or configured to) initiating wireless communication with the first and/or second wireless access points. Such an interface may comprise port(s) and/or terminal(s) to send and/or receive data, for example to and from the first and/or second wireless access points. Such an interface may further comprise radio front end circuitry that may be coupled to, or in certain embodiments a part of, an antenna to facilitate wireless communication, for example, to and from the first and/or second wireless access points. Such an interface may further comprise additional components such as filters and/or amplifiers to convert digital data into a radio signal having appropriate channel and bandwidth parameters.

Examples of other additional components that may be comprised in the first wireless device 100 include a battery or other power source.

Figure 2:
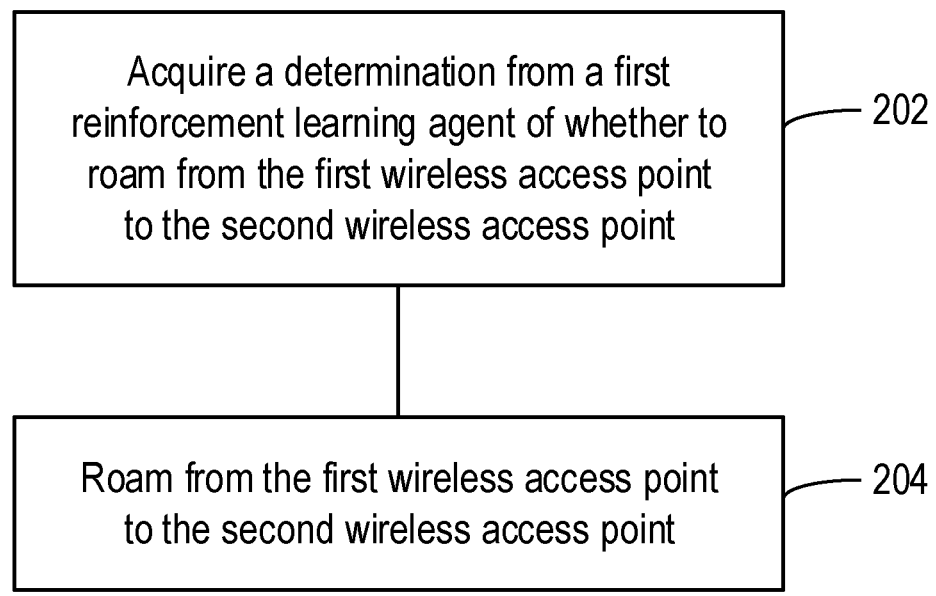
FIG. 2 shows an example method that may be performed by a first wireless device according to an embodiment.

Turning now to FIG. 2, FIG. 2 illustrates a method 200 that may be performed by a first wireless device, such as the first wireless device 100 described with respect to FIG. 1. In a first step 202, the method comprises acquiring a determination from a first reinforcement learning agent of whether to roam from the first wireless access point to a second wireless access point in a second wireless communications network. The first wireless communications network is operated by a first network operator and the second wireless communications network is operated by a second network operator. In a second step 204, the method 200 comprises roaming from the first wireless access point to the second wireless access point, based on the determination.

As noted above with respect to first wireless device 100 and FIG. 1, the first reinforcement learning agent may be located locally to the first wireless device, or located remotely from the first wireless device. As such, in some embodiments, the step of acquiring 202 may comprise using a local reinforcement learning agent to determine whether to roam from the first wireless access point to a second wireless access point in a second wireless communications network. For example, the step of acquiring 202 may comprise using the first reinforcement learning agent to determine an action to be performed by the first wireless device, the determination comprising the action.

In embodiments where the first reinforcement learning agent is located remotely to the first wireless device, the step of acquiring may comprise sending information (e.g. parameter values) to the first reinforcement learning agent to initiate or trigger the first reinforcement learning agent to make a determination (e.g. action). The step of acquiring may further comprise receiving an action from the first reinforcement learning agent that is to be performed by the first wireless device.

With respect to step 204, the first wireless device may roam from the first wireless access point to the second wireless access point according to any roaming method. The skilled person will be familiar with roaming methods, such as the multiple modems, national roaming and soft SIM card methods described in the background section herein. The skilled person will appreciate that these are example methods however and that other methods of roaming may also be employed herein.

In more detail, in some embodiments, the determination may be based on (e.g. the input parameters or the current state input to the first reinforcement learning agent may comprise) an indication of a location of the first wireless device. For example, the determination may be based on geographical co-ordinates of the first wireless device, an ID (such as a cell ID or GPS co-ordinates) of the first wireless access point and/or an ID (such as a cell ID or GPS co-ordinates) of the second wireless access point. In some embodiments, the determination may be alternatively or additionally based on (e.g. the input parameters or the current state input to the first reinforcement learning agent may comprise) a cell ID of a previously visited cell, or a time series of n cell IDs for the last n cells visited (allowing the direction and speed of the first wireless device to be determined), information related to the connectivity or quality of service of the first and/or second wireless access points (e.g. a signal interference to noise ratio (SINR), reference signal to received power ratio (RSRP) or a Quality Cell Indicator (QCI) such as, for example, a mean SINR measured whilst the first wireless device is served by a particular wireless access point). For example, the determination may be based on measurements of the throughput (on the uplink and/or the downlink), bandwidth or delay. Furthermore, the determination may be alternatively or additionally based on, for example, SINR, RSRP or QCI values of neighboring wireless access points.

As described above, when a reinforcement learning agent makes a determination (e.g. action), the first reinforcement learning agent receives a reward, based on the change that that action had on the system. In some embodiments, after an action (such as roaming) has been performed, the method may further comprise sending one or more observations (e.g. such as the connectivity or one or more quality metrics associated with the wireless access point that is serving the first wireless device) to the first reinforcement learning agent so that a reward may be determined from the observations. In some embodiments, the first reinforcement learning agent receives a reward by means of a parameter (e.g. a numerical value) indicative of the reward.

It will be appreciated by the skilled person that the terms positive reward or high reward may be used herein to denote a reward that encourages a reinforcement learning agent to perform similar actions in future. The term negative or low reward may be used to denote rewards that discourage the use of similar actions by a reinforcement learning agent in future. In this sense, it will be appreciated that "positive" and "negative" do not necessarily correspond to positive and/or negative values of a reward. For example, a reward may discourage further use of an action (e.g. providing a negative reward or negative feedback) by being numerically lower than the reward received for another action.

In some embodiments, the first reinforcement learning agent receives a parameter indicative of a positive reward (e.g. the first reinforcement learning agent receives positive feedback) if i) the second wireless access point is in a home network associated with the first wireless device and/or ii) roaming to the second wireless access point from the first wireless access point improves connectivity of the first wireless device. The first reinforcement learning agent may further receive a positive reward if a determination maintains (e.g. keeps) the first wireless device on the same wireless communications network. In this way, the first reinforcement learning agent is positively rewarded for making determinations that improve the connectivity of the first wireless device and/or lead to less roaming. In this way, rewards can be tuned so as to discourage roaming unless roaming improves connectivity. Thus the values of the parameter indicative of a reward may be tuned to reach a desired balance between maintaining appropriate connectivity, whilst roaming as little as possible.

In some embodiments, the first reinforcement learning agent may receive a parameter indicative of a positive reward if a moving wireless device reaches its destination. In such embodiments, journeys (or movements) may be formulated as episodic tasks. For example, it may be defined when each movement episode starts and ends (reaches a goal). In some embodiments, the goal of the episodic task may be reached at certain predefined locations which are known to represent the end of typical journeys. In some embodiments, the goal of the episodic task may be reached when the first wireless device has stopped moving. For example, the parameter indicative of a positive reward may be received by the first reinforcement learning agent if the first wireless device has remained at the same location for longer than a predefined duration.

If the first wireless device makes several consecutive journeys, in some embodiments, each journey may be modelled as a new episode. Alternatively, more than one journey may be accumulated or combined into a single episode depending on the manner in which the goal or end point to each episode is defined. In some embodiments, a plurality of start and end points for different episodes may be defined.

In some embodiments, the first reinforcement learning agent receives a parameter indicative of a negative reward (e.g. the first reinforcement learning agent receives negative feedback) when i) when the first wireless device roams to the second wireless access point in the second network ii) roaming to the second wireless access point decreases the connectivity of the first wireless device or iii) roaming leads to a loss of connectivity of the first wireless device and/or iv) when an inter-network operator handover procedure is performed.

In this way, the first reinforcement learning agent may be penalised or discouraged from making determinations that result in roaming, or determinations that result in reduced connectivity of the first wireless device.

In some embodiments, the first reinforcement learning agent may receive a parameter indicative of a negative reward every time that a determination leads to the first wireless device transferring service from one wireless access point to another wireless access point. This may act to encourage the first reinforcement learning agent to transfer service between wireless access points as few times as possible e.g. to prevent reductions in connectivity due to unnecessary moves between wireless access points.

In some embodiments, the values of the parameter indicative of the reward (e.g. the relative reward received) may be tuned to discourage, or more heavily discourage, certain actions or determinations over other actions. For example, in some embodiments, the first reinforcement learning agent may receive a parameter indicative of a more negative reward (e.g. more negative feedback) if a determination leads to a reduction or complete loss of connectivity, compared to if a determination leads to roaming. In this way, the rewards received encourage maintaining connectivity, even if that means roaming to another wireless communications network.

Generally, rewards are allocated to the first reinforcement learning agent according to a reward function which describes the rewards allocated for different outcomes of an action. The reward function may be defined by a user (e.g. network administrator) of the system, and the relative magnitude of each reward may be tuned, as described above, according to the overall goal of said user. The reward function may also be obtained by a machine learning process.

It will be understood that the first reinforcement learning agent may perform more than one determination or action. In some embodiments, the first wireless device may acquire a plurality of determinations (or actions) from the first reinforcement learning agent in sequence. Each determination may result in the first reinforcement learning agent receiving a reward, according to the consequences of the action, for example, according to the principles described above. These rewards may be used by the reinforcement learning agent to update a model associated with the first reinforcement learning agent to improve future determinations (e.g. such as future actions as to whether the first wireless device should roam, or not roam).

Figure 3:
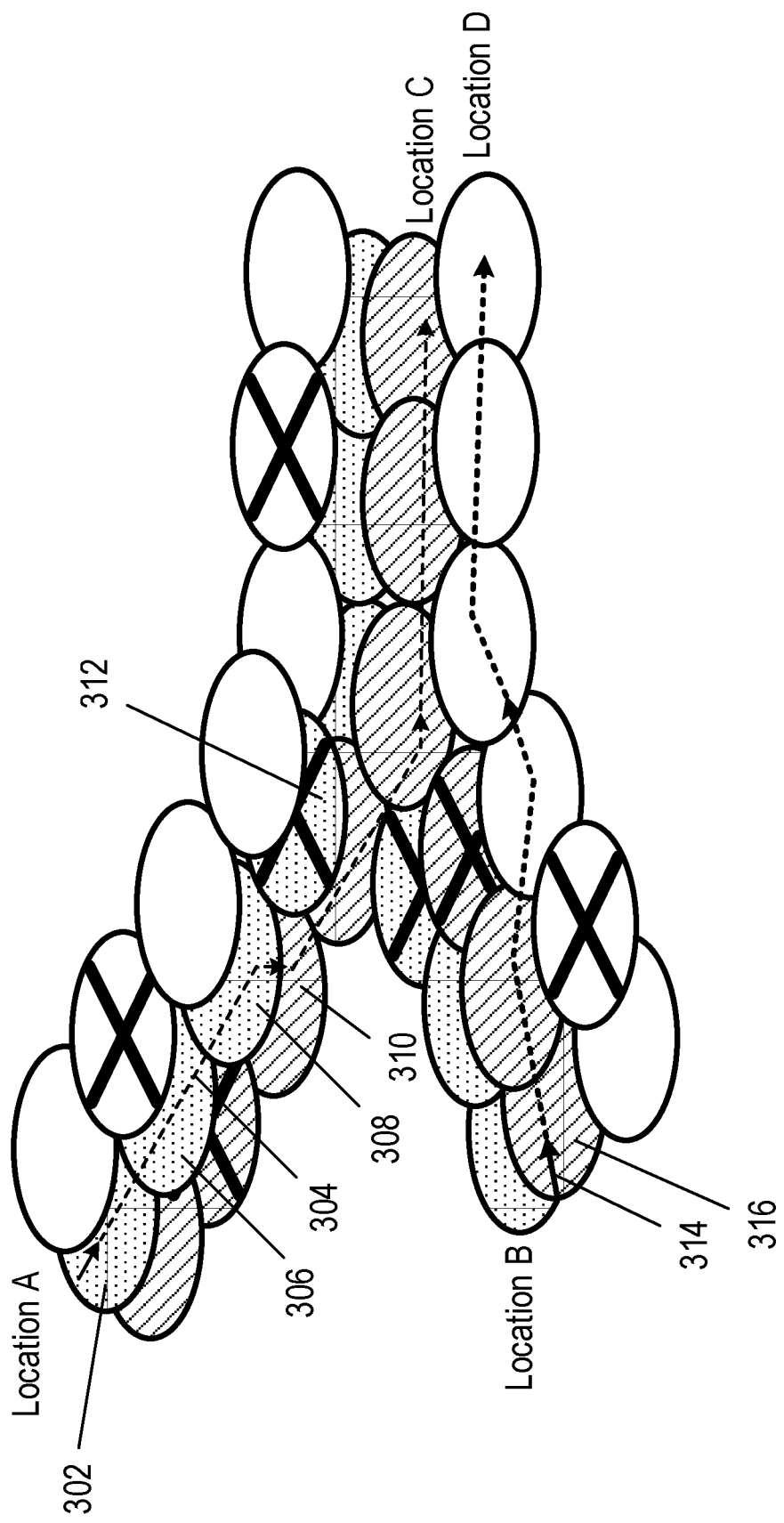
FIG. 3 illustrates how methods according to embodiments herein may be applied to a plurality of wireless access points in a plurality of wireless communications networks.

The principles described above are illustrated in FIG. 3. FIG. 3 illustrates a plurality of wireless access points, each wireless access point denoted by a circle. The wireless access points belonging to a first wireless communications network operated by a first network operator are illustrated by the dotted circles, and those of a second wireless communications network operated by a second network operator are indicated by the hatched circles. Wireless access points belonging to a third wireless communications network operated by a third network operator are illustrated by the clear circles. In FIG. 3, overlapping wireless access points denote wireless access points that are capable of serving a wireless device at a particular geographic location. Each wireless communications network has wireless access points covering each area, but with varying connectivity. A first wireless device starts at Location A at wireless access point 302 and moves in a direction along the dotted line 304 through wireless access points 306 and 308. The first wireless device is served by the first wireless communications network. When the first wireless device reaches the edge of a service region of a wireless access point (e.g. the edge of a cell), the first wireless device acquires a determination from a first reinforcement learning agent of whether to roam from the current wireless access point in the first wireless communications network to another wireless access point in the first wireless communications network, or whether to roam to a wireless access point in a second wireless communications network (e.g. according to step 202 of method 200 as described above). The determination may be based on the learnt experience of the first reinforcement learning agent according to rewards received when other wireless devices have previously roamed to the wireless access point in the second wireless communications network, compared to the rewards received when previous wireless devices stayed on an access point in the first wireless communications network. Generally, the goal of the reinforcement learning agent in this embodiment is to avoid black holes (denoted by the crosses) and minimize inter-wireless communication system (i.e. inter-operator) roaming.

In the example shown in FIG. 3, when the first wireless device gets to the edge of a service region of wireless access point 308, the acquired determination from the first reinforcement learning agent indicates that the first wireless device should roam from the first wireless access point to a second wireless access point 310 in a second wireless communications network. In this example, this determination is based on the learnt experience that wireless access point 312 in the first wireless communication system has poor connectivity (e.g. the wireless access point may have no connectivity and be a "black hole"). The first wireless device then roams from the wireless access point 308 to the second wireless access point 310, based on the determination. The dotted line 304 from Location A shows the optimal path through the wireless communications network to Location C that is to be taken in order to minimize the number of roaming events whilst maximizing the connectivity. Similarly, dotted line 314 starting from Location B shows the optimal path through the wireless communications network from wireless access point 316 that is to be taken to Location D in order to minimize the number of roaming events whilst maximizing connectivity.

Turning to further embodiments, in some embodiments, the first reinforcement learning agent may implement a Q-learning method. The skilled person will be familiar with Q-learning, but briefly, in Q-learning, the first reinforcement learning agent learns and selects actions based on a Q-table. The Q-table comprises a matrix all of the available actions that may be performed for each current state along with an associated Q-value for each action. The Q-values are updated as the first reinforcement learning agent learns (e.g. they are updated each time the first reinforcement learning agent receives a reward for performing an action). In effect, the Q-values provide a ranking for each action that may be performed from each state, and this ranking allows the first reinforcement learning agent to select the next action to perform.

In some embodiments, the Q-table associated with the first reinforcement learning agent may be updated based on Q-values stored in Q-tables associated with other reinforcement learning agent(s). For example, reinforcement learning agents may share Q-values or provide updates to a central server for redistribution to individual reinforcement learning agents. As such, in some embodiments, information (such as Q-values) related to a Q-table of the first reinforcement learning agent may be sent to the first reinforcement learning agent for incorporation into the Q-table of the first reinforcement agent (or vice versa).

In some embodiments, Q-values may be copied into a Q-table associated with the first reinforcement learning agent. For example, the Q-table of the first reinforcement learning agent may be initialised with Q-values that were learnt by another reinforcement learning agent. In this way, the first reinforcement learning agent does not have to learn from scratch, rather, the first reinforcement learning agent may build on the learnt insights gained by the other reinforcement learning agent.

Figure 4:
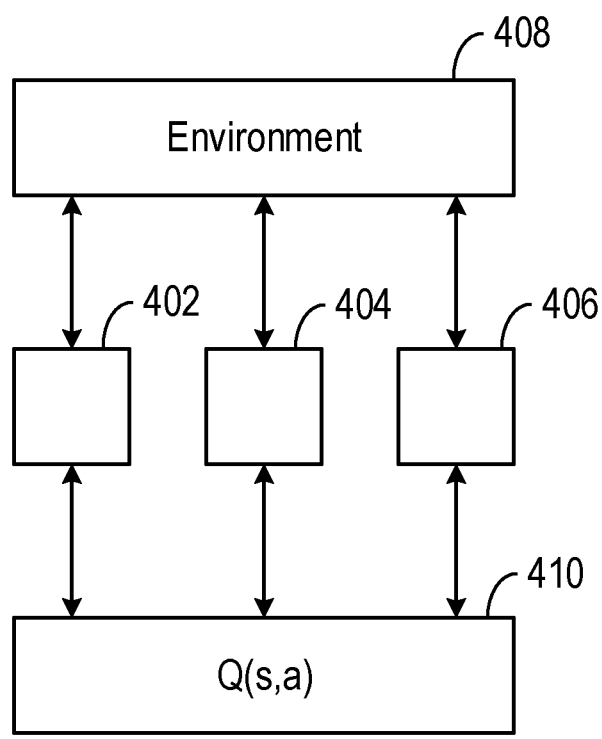
FIG. 4 illustrates how a plurality of reinforcement learning agents may share a central Q-table according to some embodiments.

In some embodiments, a central Q-table may be stored that comprises aggregated (e.g. average) Q-values gained from a plurality of reinforcement learning agents that are each used to determine actions for a different wireless device. This is shown in FIG. 4 which illustrates three reinforcement learning agents 402, 404 and 406 respectively that each interact with environment 408 by performing actions with respect to respective wireless devices (not shown in FIG. 4). Each reinforcement learning agent 402, 404 and 406 may send updates (e.g. in the form of deltas or difference vectors) for each Q-value to a central Q-table 410 and these may be combined (e.g. by averaging) to update the central Q-table. The new, updated values may then be distributed to the reinforcement learning agents 402, 404 and 406.

As such, in some embodiments, a reinforcement learning agent 402, 404 and 406 may receive an update from a central Q-table and/or send updates to a central Q-table. Generally speaking, a wireless device may download the current model from a central Q-table such as central Q-table 410, for use by a local reinforcement learning agent, improve it by learning from data on the wireless device, and then summarize the changes as a small focused update. In some embodiments, only this update to the model is sent to the cloud. The update may be sent using encrypted communication. The update may be averaged with other user updates to improve the central model. The updated model can be used immediately and the averaging makes the solution more robust. Furthermore, the use of distributed learning in this fashion may speed up the reinforcement learning process because the reinforcement learning agents may learn from one another. Furthermore, where updates are transmitted as difference vectors (e.g. offsets or deltas) to the values in the central Q-table, this may reduce transmission overhead compared to sending the Q-values directly.

In some situations, for example, where the first reinforcement learning agent makes decisions with respect to large geographical areas including large numbers of wireless access points and/or multiple wireless communications network, a Q-table associated with the first reinforcement learning agent may become unfeasibly large. Therefore in some embodiments, a machine learning method may be used to predict a Q-value, based on input parameters relating to the first and or second wireless access points. Examples of appropriate machine learning methods include, but are not limited to neural networks, Random Forest, Support Vector Machines and Logistic Regression methods. In this way, Q-values from large Q-tables may be approximated so that the full Q-table need not be stored.

In some examples, as will be discussed in more detail below, the first reinforcement learning agent shares a reward function with (e.g. is rewarded in the same way as) a second reinforcement learning agent, the second reinforcement learning agent being associated with a second wireless device.

In some embodiments, the first wireless device and the second wireless device form part of a first group of wireless devices and the shared reward function is shared between the devices in the first group of wireless devices. For example, the first group of wireless devices may comprise devices of a common type (e.g. mobile phones, cameras, IoT devices M2M devices etc), common functionality and/or common service requirements. In this way, a single reward function can be used to reward/train a plurality of reinforcement learning agents associated with a plurality of different devices. This is described in more detail below with respect to FIGS. 7, 8 and 9.

Figure 5:
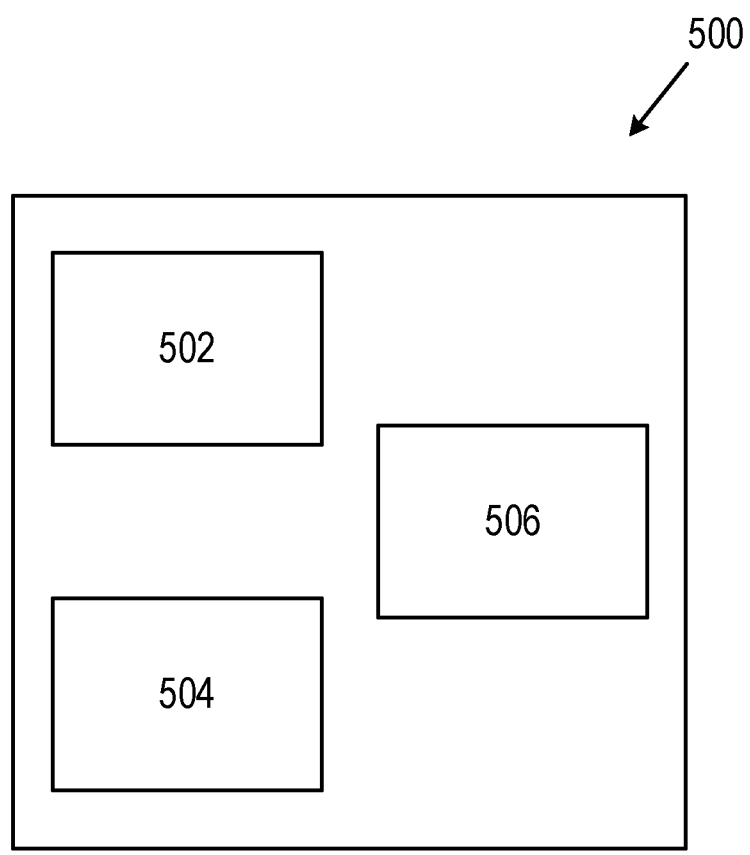
FIG. 5 illustrates an example node in a wireless communications network according to some embodiments.

Turning now to FIG. 5, in some embodiments, there is a node 500 in a wireless communications network. The node 500 comprises a processor 502, a memory 504 and a first reinforcement learning agent 506. The memory 504 contains instructions executable by the processor 502. Details regarding processors and memories were described above with respect to the processor 102 and the memory 104 of wireless device 100 shown in FIG. 1 and these details will be understood to apply equally to the processor 502 and memory 504 of node 500.

Briefly, node 500 is operative (e.g. adapted or configured) to acquire a determination from a first reinforcement learning agent 506 of whether a first wireless device served by a first wireless access point in a first wireless communications network should roam from the first wireless access point to a second wireless access point in a second wireless communications network. The first wireless communications network is operated by a first network operator and the second wireless communications network is operated by a second network operator. The node 500 is further operative to instruct the first wireless device to roam from the first wireless access point to the second wireless access point, based on the determination.

In this way, in some embodiments, the node 500 may interact with a wireless device, such as the first wireless device 100 described with respect to FIG. 1 in order to perform the method 200 in embodiments of the method 200 where the first reinforcement learning agent (as referred to in method 200 of FIG. 2) is located remotely from the first wireless device 100. This was described above in the sections relating to the first wireless device 100 and the method 200 and the details therein will be understood to apply here.

The use of a remote first reinforcement learning agent may enable a single reinforcement learning agent to oversee (e.g. make determinations or actions for) a plurality of wireless devices, as will be described in more detail below.

Generally, the node 500 may comprise any component in the telecommunications network suitable for sending and/or receiving data (e.g. including but not limited to the determination, parameters and/or data relating to the determination and/or a message to instruct the first wireless device to roam) to a wireless device such as the first wireless device 100. For example, the node 500 may comprise an access point (AP) (e.g., a radio access point), a base station (BSs) (e.g., a radio base station, a Node B, an evolved Node B (eNB) an NR NodeB (gNB)) or any other node suitable for performing the methods performed by a node 500 as described herein. In some embodiments, the node 500 may comprise a server. For example, such a server may employ cloud technology or be located (e.g. distributed) in a cloud environment.

Details relating to the first reinforcement learning agent 506 were provided in detail above with respect to the first reinforcement learning agent 106 and the method 200 and the details therein will be understood to apply equally to the first reinforcement learning agent 506.

As was described above with respect to the first reinforcement learning agent 106, in some embodiments, the first reinforcement learning 506 agent implements a Q-learning method. In some embodiments, the first reinforcement learning agent is associated with a plurality of wireless devices and the first reinforcement learning agent updates a central Q-table based on actions performed by the plurality of wireless devices. In this way, a single (e.g. remotely or centrally located) reinforcement learning agent may learn from determinations made for a plurality of wireless devices. Such federated learning may result in quicker or more efficient training of the first reinforcement learning agent.

As will be appreciated by the skilled person, the node 500 may comprise additional components to those illustrated in FIG. 5. For example, node 500 may comprise an interface for facilitating wireless communication between the node 500 and a wireless communications network and/or a power source such as a battery. Details relating to the types of interface that may be found in node 500 were provided above with respect to the interface described with respect to the first wireless device 100. The details therein will be understood to apply equally to an interface comprised in the node 500.

Figure 6:
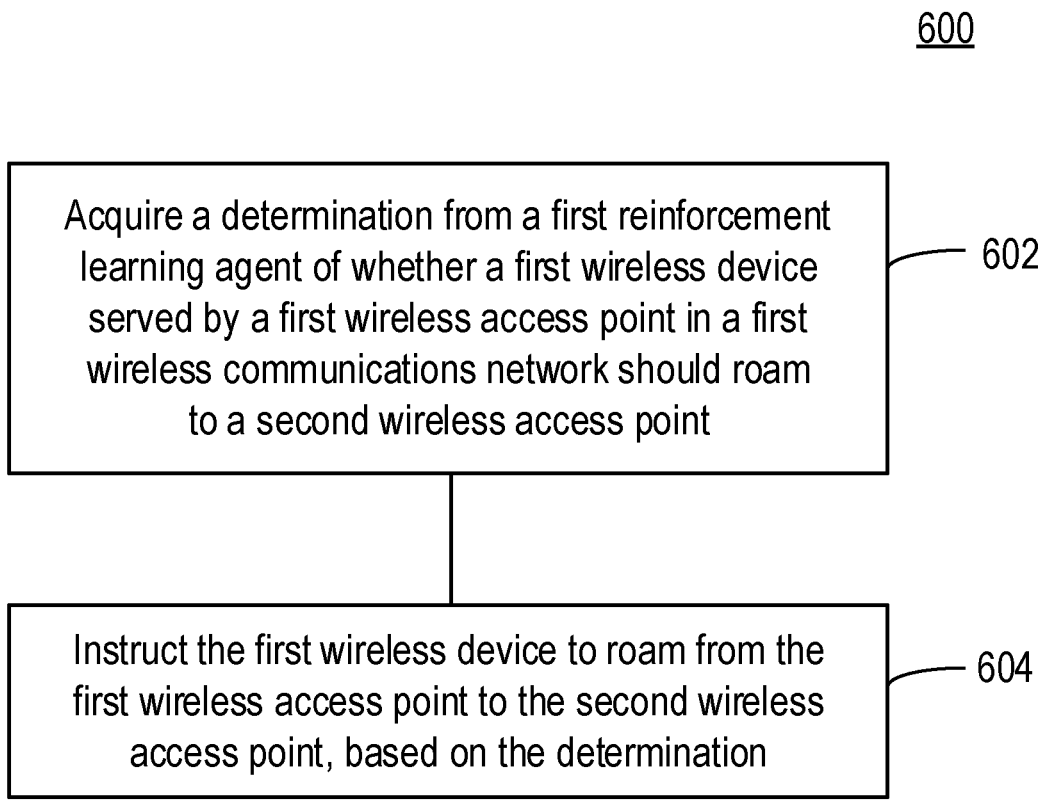
FIG. 6 shows an example method performed by a node of a wireless communications network according to some embodiments.

Turning now to FIG. 6, FIG. 6 shows a method 600 performed by a node of a wireless communications network. The method 600 may be performed by a node such as the node 500 described above with respect to FIG. 5.

In a first step 602, the method comprises acquiring a determination from a first reinforcement learning agent of whether a first wireless device served by a first wireless access point in a first wireless communications network operated by a first network operator should roam from the first wireless access point to a second wireless access point in a second wireless communications network operated by a second network operator. In a second step 604, the method comprises instructing the first wireless device to roam from the first wireless access point to the second wireless access point, based on the determination.

Acquiring 602 a determination from a first reinforcement learning agent of whether a first wireless device served by a first wireless access point in a first wireless communications network should roam from the first wireless access point to a second wireless access point in a second wireless communications network was described above with respect to method step 102 of method 100 and the details therein will be understood to apply equally to step 502 described here.

As noted above, generally, the step of acquiring 602 may comprise receiving information related to the first wireless communications device (e.g. information indicative of location of the first wireless device, information indicative of a quality of service of the first wireless access point, and/or information indicative of a quality of service of the second wireless access point.) The step of acquiring 602 may further comprise providing the received information to the first reinforcement learning agent to trigger the first reinforcement learning agent to determine an action that should be taken by the first wireless device. By determining the action, the first reinforcement learning agent determines whether the first wireless device should roam from the first wireless access point to a second wireless access point in a second wireless communications network.

In some embodiments, the step of instructing 604 the first wireless device to roam may comprise the first node sending a message to the first wireless device, the message containing an instruction to the first wireless device to roam to the second wireless access point in the second wireless communications network.

As described above with respect to method 200, in some embodiments, the first reinforcement learning agent implements a Q-learning method. In some embodiments, the first reinforcement learning agent is associated with a plurality of wireless devices and the method further comprises the first reinforcement learning agent updating a central Q-table based on actions performed by the plurality of wireless devices. In this way, a single reinforcement learning agent may be used to control and optimise roaming events for a plurality of wireless devices and may learn from the actions taken by the plurality of devices, as opposed to an individual wireless device. This may speed up the learning process of the first reinforcement learning agent.

Figure 7:
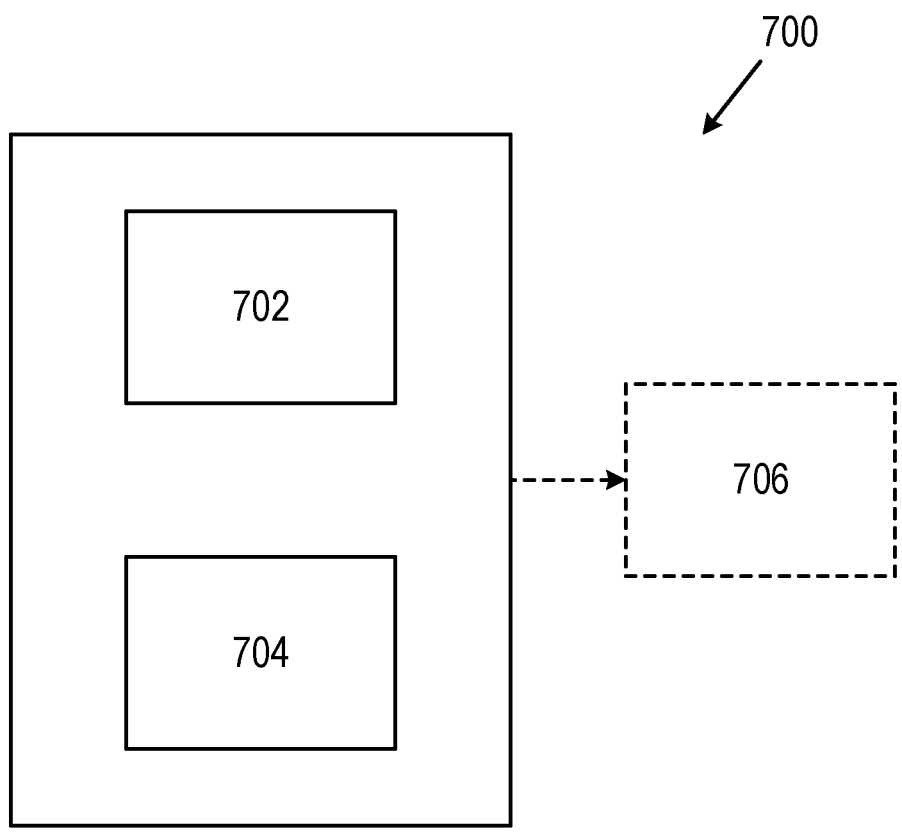
FIG. 7 illustrates an example node in a wireless communications network according to some embodiments.

Turning now to FIG. 7, there is a node 700 in a wireless communications network. The node 700 comprises a processor 702 and a memory 704. The memory 704 contains instructions executable by the processor 702. Details with respect to processors and memories and the interactions thereof were provided with respect to the processors 102 and memory 104 of first wireless device 100 and the details therein will be understood to apply equally to the processor 702 and memory 704 of node 700 respectively.

The node 700 is configured to interact with a first reinforcement learning agent 706. The first reinforcement learning agent 706 may be the same as the first reinforcement learning agents 106 and/or 506 described with respect to FIGS. 1 and 5. In some embodiments, the node 700 may interact with the first reinforcement learning agents 106 and/or 506 described above to implement the methods 200 and/or 600 respectively.

In brief, the node 700 is operative to allocate a parameter indicative of a reward to a first reinforcement learning agent 706 based on an action determined by the first reinforcement learning agent, the action comprising providing an instruction to a first wireless device served by a first wireless access point in a first wireless communications network operated by a first network operator, the instruction instructing the first wireless device to roam from the first wireless access point to a second wireless access point in a second wireless communications network operated by a second network operator.

In this way, rewards may be distributed centrally to one or more reinforcement learning agents, based on a common goal and thus a common reward policy.

As will be appreciated by the skilled person, the node 700 may comprise additional components to those illustrated in FIG. 7. For example, node 700 may comprise an interface for facilitating wireless communication between the node 700 and a wireless communications network and/or a power source such as a battery. Details relating to the types of interface that may be found in node 700 were provided above with respect to the interface described with respect to the first wireless device 100. The details therein will be understood to apply equally to an interface that may be comprised in the node 700.

Turning now to FIG. 8, there is a method 800 performed by a node of a wireless communications network. The method 800 may be performed, for example, by the node 700 described above with respect to FIG. 7.

In a step 802, the method 800 comprises allocating a parameter indicative of a reward to a first reinforcement learning agent based on an action determined by the first reinforcement learning agent, the action comprising providing an instruction to a first wireless device served by a first wireless access point in a first wireless communications network operated by a first network operator, the instruction instructing the first wireless device to roam from the first wireless access point to a second wireless access point in a second wireless communications network operated by a second network operator.

In this way, rewards may be distributed centrally to one or more reinforcement learning agents, based on a common goal and thus a common reward policy.

Using a first reinforcement learning agent to determine whether a first wireless device served by a first wireless access point in a first wireless communications network should roam to a second wireless access point in a second wireless communications network was described above with respect to methods 100 and 600 and the details therein will be understood to apply equally to the determinations of the first reinforcement learning agent described with respect to method step 802 of method 800.

Parameters indicative of a reward (e.g. including parameters indicative of positive and negative rewards) were discussed in detail with respect to method 100 and it will be understood that the circumstances in which different rewards are allocated apply equally to the node 700.

For example, as described above, in some embodiments, when the first reinforcement learning agent makes a determination (e.g. action), a node (such as the node 700) may allocate a reward based on the change that that action had on the first wireless device. For example, in some embodiments, the step of allocating 802 may comprise allocating a parameter indicative of a positive reward to the first reinforcement learning agent (e.g. the first reinforcement learning agent receives positive feedback) if i) the second wireless access point is in a home network associated with the first wireless device and/or ii) roaming to the second wireless access point from the first wireless access point improves connectivity of the first wireless device. The first reinforcement learning agent may further receive a positive reward if a determination maintains (e.g. keeps) the first wireless device on the same wireless communications network.

In some embodiments, the step of allocating 802 may comprise allocating a parameter indicative of a positive reward to the first reinforcement learning agent if a moving wireless device reaches its destination. In such embodiments, journeys (or movements) may be formulated as episodic tasks (as described above with respect to method 100).

In some embodiments, the step of allocating 802 may comprise allocating a parameter indicative of a negative reward (e.g. the first reinforcement learning agent receives negative feedback) when i) when the first wireless device roams to the second wireless access point in the second network ii) roaming to the second wireless access point decreases the connectivity of the first wireless device or iii) roaming leads to a loss of connectivity of the first wireless device and/or iv) when an inter-network operator handover procedure is performed.

In some embodiments, the step of allocating 802 may comprise allocating a parameter indicative of a negative reward to the first reinforcement learning agent every time that a determination leads to the first wireless device transferring service from one wireless access point to another wireless access point.

In some embodiments, the step of allocating 802 comprises allocating the parameter indicative of a reward according to a first reward function. A reward function describes the value or magnitude of the reward that is allocated by the node 800 (or received by the first reinforcement learning agent 106, 506, 706) for a determination or action made by the first reinforcement learning agent.

As an illustrative example, a reward function may indicate that a reward of: i) "−0.1" should be allocated to the first reinforcement agent each time that a determination (e.g. action) results in roaming of the first wireless device; ii) "−1" if a transfer of service from one wireless access point to another results in the first wireless device losing coverage (e.g. if the first wireless device enters a black hole); iii) "−0.01" every time service is transferred from one wireless access point to another; and iv)+4 when the first wireless device reaches its destination. In this example, loss of connectivity is therefore the most highly penalised action. The skilled person will appreciate that these values are merely examples however and that the first reward function may comprise any other combination of rewards and reward values, the rewards and relative reward values being tuned according to the (optimisation) goal.

Furthermore, the first reward function may allocate rewards based on a (weighted) sum of several of different measurements or factors. In some embodiments, the reward function may comprise a summation of different factors (or individual rewards). For example, in some embodiments, a single reward function in the form of R=a*(upload bandwidth)+b*(1/minimum delay) may be used, where a and b are hyper-parameters that weight the upload bandwidth and minimum delay. The inverse of the delay is used where a lower delay is preferable.

In some embodiments, the first wireless device is part of a first group of wireless devices and the method further comprises allocating a parameter indicative of a reward to another wireless device in the first group of wireless devices using the first reward function. In this way, the first reward function is used to allocate rewards to more than one reinforcement learning agent. Thus a common reward policy may be adopted for a group of wireless devices.

In some embodiments, the first group of wireless devices may comprise devices of a common type (e.g. mobile phones, cameras, IoT devices, smart watches, home appliances, agricultural sensors, drones, connected vehicles, M2M devices etc). In some embodiments, the first group of wireless devices may comprise devices having common functionality (e.g. such as the first group of wireless devices may all be used for making calls or uploading the same type of data, e.g. video data). Grouping the devices in this way may reflect the fact that "good connectivity" is different for different devices.

For example, cameras may be primarily concerned with upload bandwidth in order to upload photographs. In this example, therefore, the first reward function may be largely based on uplink bandwidth, or measurements related to the uplink quality (e.g. positive rewards for improving or maintaining uplink bandwidth/quality above certain thresholds).

Self-driving cars and other devices requiring real-time data may form a first group of wireless devices for which an appropriate reward function is based around minimum delay (e.g. encouraging roaming over increasing delay). In such embodiments, changes to the average or maximum delay may result in a reward being allocated to the first reinforcement learning agent.

In some embodiments, the wireless devices in the first group of wireless devices may have at least one common connection parameter. The common connection parameter may comprise, for example, a minimum upload bandwidth and/or a maximum allowable delay. The first group of wireless devices may therefore have common service or quality of service requirements.

In some embodiments, the first reward function may be updated (or defined) through a machine learning process. For example, a machine learning algorithm may be used to determine the most appropriate groupings and/or the most appropriate reward function for wireless devices in a group according to the effect that different values of rewards have on the roaming behaviour and/or connectivity of the devices in the first group of wireless devices. For example, a machine learning process may be used to determine appropriate valued rewards in order to achieve a threshold level of connectivity and/or a threshold level of roaming in the wireless devices comprised in the first group of wireless devices. The skilled person will appreciate that many types of machine learning processes may be used to update the first reward function in this manner, including but not limited to the use of unsupervised methods such as clustering (e.g. k-means may be performed on the characteristics of each device) or supervised methods (e.g. such as the use of neural networks), if labelled data is available.

The skilled person will appreciate that the teachings above may be applied to more than one group of wireless devices, each group having a different reward function. For example, in some embodiments, the method 800 may further comprise allocating a parameter indicative of a reward to a third reinforcement learning agent based on an action determined by the third reinforcement learning agent for a third wireless device, wherein the third wireless device is part of a second group of wireless devices. In this embodiment, allocating a parameter indicative of a reward to a third reinforcement learning agent may comprise allocating a parameter indicative of a reward using a second reward function, the second reward function being different to the first reward function.

For example, the second group of wireless devices may comprise any one of the types of groups of wireless devices listed above for the first group of wireless devices. In this way, rewards may efficiently be allocated to wireless devices in each group to achieve the optimal connectivity according to the needs/requirements of wireless devices in each group.

Figure 9:
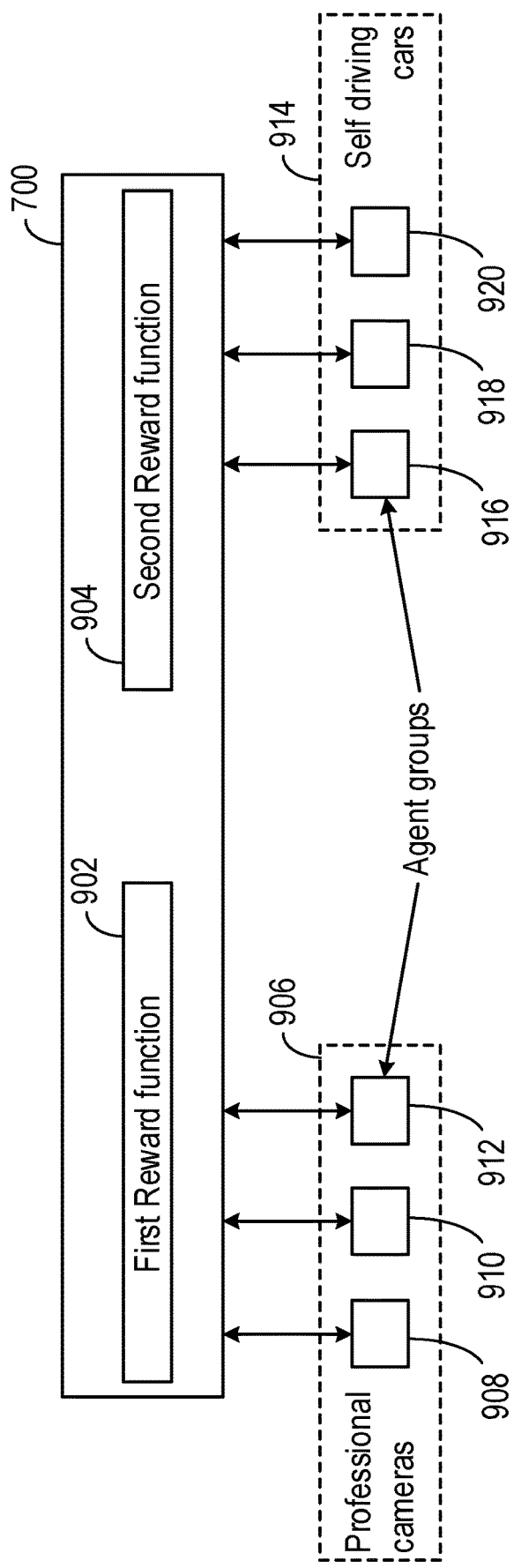
FIG. 9 shows an example system according to some embodiments.

These principles are illustrated in FIG. 9 which shows a system according to some embodiments herein. In this embodiment, there is a first group of reinforcement learning agents 906 comprising reinforcement learning agents 908, 910 and 912. The first group of reinforcement learning agents correspond to a first group of wireless devices (not shown in FIG. 9). For example, each reinforcement learning agent 908, 910 and 912 may determine actions for a corresponding wireless device. In this embodiment, the first group of wireless devices comprise professional cameras.

There is also a second group of reinforcement learning agents 914 comprising reinforcement learning agents 916, 918 and 920. The second group of reinforcement learning agents correspond to a second group of wireless devices (not shown in FIG. 9). For example, each reinforcement learning agent 916, 918 and 920 may determine actions for a corresponding wireless device. In this embodiment, the second group of wireless devices comprise self-driving cars.

A node 700 stores a first reward function 902 and a second reward function 904. The node 700 allocates rewards to reinforcement learning agents in the first group of reinforcement learning agents 906 according to the first reward function 902 and allocates rewards to reinforcement learning agents in the second group of reinforcement learning agents 914 according to the second reward function 904.

For cameras the upload bandwidth may be important. It may be desirable to quickly submit high resolution photos. Some existing professional cameras support such functionality by providing multiple built in modems with separate SIM cards with separate subscriptions. This is a very expensive solution and in many cases it may not help if the connectivity of all of the installed modems is low. As such, the first reward function may monitor the upload bandwidth for the first group of wireless devices corresponding to the first group of reinforcement learning agents 906. The upload bandwidth can be measured by counting the number of bytes successfully sent uplink per time period. Byte information is available in layer 3 IP headers and needs to be aggregated over time e.g. Kbytes per second.

For self-driving cars the packet transmission delay of the connectivity may be important. For example, when self-driving cars may need to communicate temporal variations of the road conditions e.g. oil leakage causing slippery roads the delay should not be more than a few milliseconds in order to avoid collisions. Other examples may be the reporting of temporary problems or traffic jams. The second reward function 904 may derive the delay by measuring the Round Trip Time (RTT) by monitoring TCP traffic, or by using other latency-estimation-methods. Examples may be measuring the time between the packets that were injected back-to-back, or by measuring round-trip-time for pings.

In such an embodiment therefore, the first reward function 902 may allocate a positive or higher reward (e.g. a reward that encourages similar actions) for actions that result in high uplink bandwidth. The second reward function 904 may allocate a positive or higher reward (e.g. a reward that encourages similar actions) for actions that result in low delay. Both the first and second reward functions 902 and 904 may reward low or negative rewards (e.g. rewards that discourage similar actions) if a wireless device loses connectivity. In this way, the node 700 may be used to allocate rewards to different groups of reinforcement learning agents according to the connectivity requirements of their respective wireless devices.

In another embodiment, for the reasons described above, different devices often have very different requirements. Said different requirements may be described as different profiles. Devices of each profile may be allocated rewards according to a different reward matrix describing the rewards of that specific profile. In embodiments where the first reinforcement learning agent (or the reinforcement learning agents corresponding to a group of wireless devices) uses Q-learning, each different reward matrix may result in a different Q matrix, e.g. one for each profile.

Figure 10:
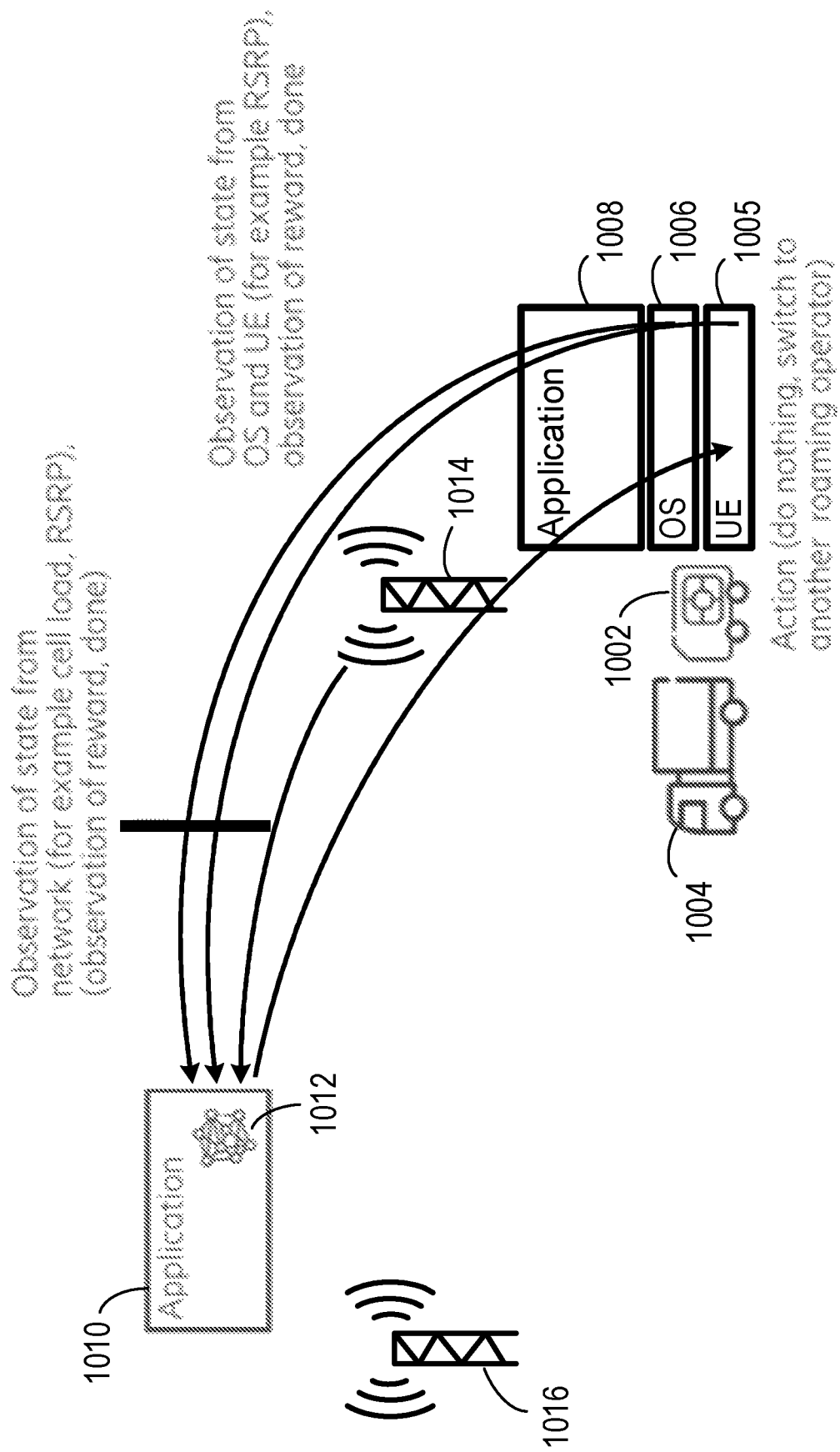
FIG. 10 shows an example system according to some embodiments.
Figure 11:
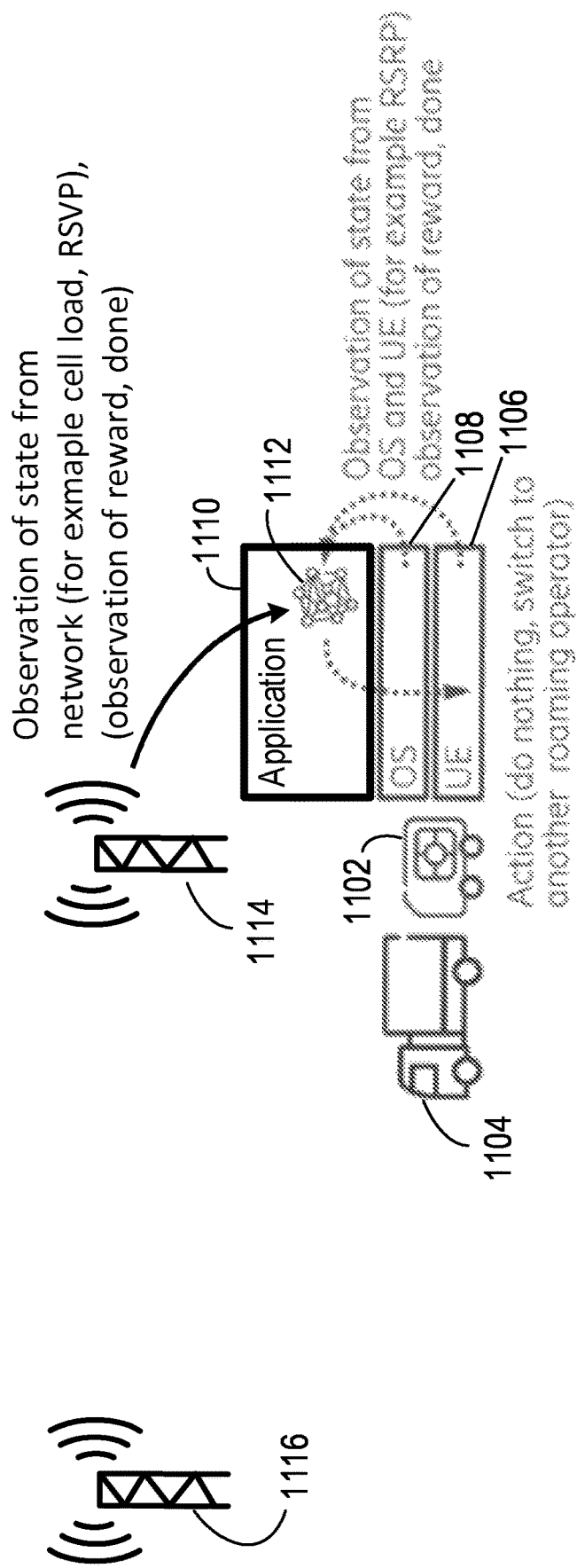
FIG. 11 shows an example system according to some embodiments.

Turning now to FIGS. 10 and 11, FIGS. 10 and 11 illustrate two implementations of embodiments described herein.

FIG. 10 illustrates a first wireless device in the form of a SIM card 1002 embedded in a moving vehicle 1004. The first wireless device further comprises a UE layer 1005, an operating system 1006 (e.g. processor such as the processor 102 in first wireless device 100 described above) and an application 1008 that interacts with a remote application 1010. The remote application 1010 may be located on a remote server or in a cloud computing environment. In this embodiment, a first reinforcement learning agent 1012 sits in the remote application 1010.

The first wireless device is served by a first wireless access point 1014 that is part of a first wireless communications network (e.g. operated by a first network operator). The application 1008 may perform the method 200 described above. For example, the application 1008 may acquire (e.g. according to step 202 of method 200) a determination from the first reinforcement learning agent 1012 of whether to roam from the first wireless access point 1014 to a second wireless access point 1016, the second wireless access point 1016 being in a second wireless communications network that is a different wireless communications network to the first wireless communications network (e.g. operated by a second network operator). The application 1008 may then roam (e.g. according to step 204 of method 200) from the first wireless access point 1014 to the second wireless access point 1016, based on the determination.

In this embodiment, put in formal terms, the "environment" comprises a module comprising an eSIM (e.g. SIM 1002) and one or more modems. Observations of the environment comprise the observations of the "state", as explained previously, and also comprise the components that make up the reward function (for example, the reward function or reward may be calculated based on the numerical values of the observations of the environment or numerical values representing the state). The reinforcement learning agent 1012 sits in an application 1010 in the cloud and receives state and reward information from the OS 1006 and UE 1005 layers via an application 1008 on the wireless device. The device application 1008 also receives actions from the cloud application 1010 which are then forwarded to the UE 1005 to perform the action.

Turning to FIG. 11, FIG. 11 illustrates an embodiment whereby the first wireless device comprises a SIM card 1102 embedded in a moving vehicle 1104. The first wireless device further comprises a user equipment (UE) layer 1106, an operating system (OS) 1108 (e.g. a processor such as the processor 102 in first wireless device 100 described above) and an application 1110. In this embodiment, a first reinforcement learning agent 1112 sits locally to the first wireless device, in the application 1110.

The first wireless device is served by a first wireless access point 1114 that is part of a first wireless communications network (e.g. operated by a first network operator). The application 1110 may perform the method 200 described above. For example, the application 1110 may acquire (e.g. according to step 202 of method 200) a determination from the first reinforcement learning agent 1112 of whether to roam from the first wireless access point 1114 to a second wireless access point 1116, the second wireless access point 1116 being in a second wireless communications network that is a different wireless communications network to the first wireless communications network (e.g. operated by a second network operator). The application 1110 may then roam (e.g. according to step 204 of method 200) from the first wireless access point 1114 to the second wireless access point 1116, based on the determination.

In this scenario, where the first reinforcement learning agent 1112 is deployed in an application 1110 on the wireless device, the first reinforcement learning agent may receive state and reward information from the OS 1108 and UE 1106 layers and possibly also from the wireless access point 1114. The state may comprise, for example radio quality related measurements from the wireless device, load information from the wireless access point 1114, information related to wireless access point 1116, a time series of SINR values from the wireless access point(s) 1114, 1116, timing advance measurements and/or load on one or more wireless access points. The reward may also be made up of (e.g. calculated from) measurements from the wireless device and from the network.

Figure 12:
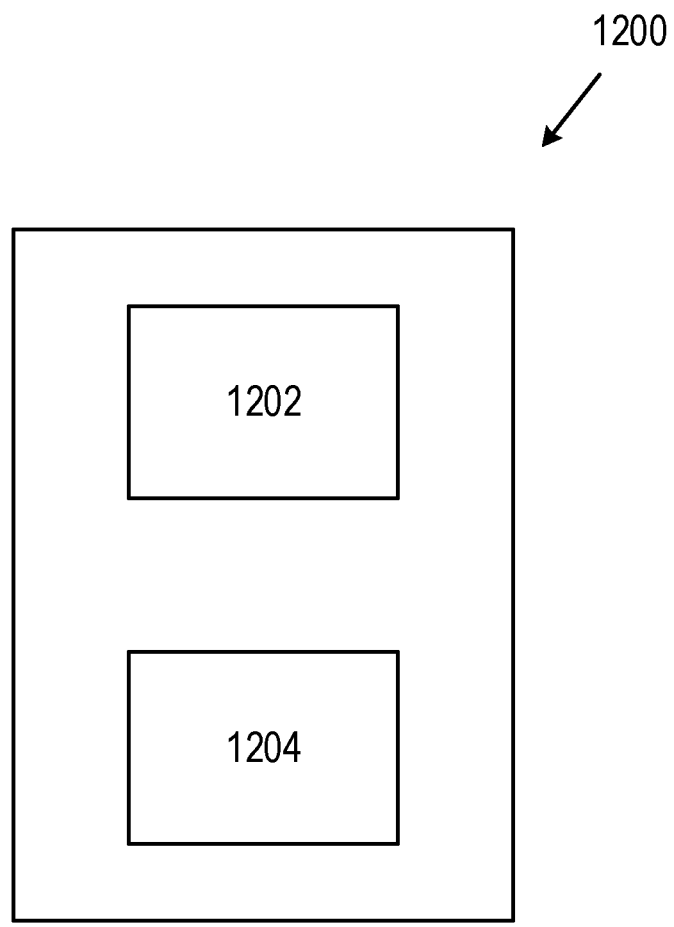
FIG. 12 illustrates an example computer program product according to some embodiments.

Turning now to FIG. 12, in some embodiments, there is a computer program product 1200 comprising a computer readable medium 1202 and a computer program 1204. The computer program 1204 comprises instructions which, when executed on at least one processor, cause the at least one processor to carry out the any of the methods described herein (for example, any of the methods 200, 600 or 800).

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the preceding description.

The invention claimed is:

1. A method performed by a first wireless device, the first wireless device being served by a first wireless access point in a first wireless communications network, the first wireless communications network being operated by a first network operator, the method comprising:

acquiring a determination from a first reinforcement learning agent of whether to roam from the first wireless access point to a second wireless access point in a second wireless communications network, the second wireless communications network being operated by a second network operator, wherein the determination is based at least partially on a reward function that is also shared from the first reinforcement learning agent to a second reinforcement learning agent that is associated with a second wireless device; and roaming from the first wireless access point to the second wireless access point, based on the determination.

2. The method as in claim 1, wherein the first wireless device and the second wireless device form part of a group of wireless devices and the shared reward function is shared between the wireless devices in the group of wireless devices.

3. The method as in claim 2, wherein the devices in the group of wireless devices have at least one common connection parameter.

4. The method as in claim 1, wherein the first reinforcement learning agent receives a parameter indicative of a positive reward when one or more of:

the second wireless access point is in a home network associated with the first wireless device; and/or roaming to the second wireless access point from the first wireless access point improves connectivity of the first wireless device.

5. The method as in claim 1, wherein the first reinforcement learning agent receives a parameter indicative of a negative reward when one or more of:

the first wireless device roams to the second wireless access point in the second network;

roaming to the second wireless access point decreases the connectivity of the first wireless device;

roaming leads to a loss of connectivity of the first wireless device; and/or when an inter-network operator handover procedure is performed.

6. A method performed by a node of a wireless communications network, the method comprising:

acquiring a determination from a first reinforcement learning agent of whether a first wireless device served by a first wireless access point in a first wireless communications network operated by a first network operator should roam from the first wireless access point to a second wireless access point in a second wireless communications network operated by a second network operator, wherein the first reinforcement learning agent is associated with a plurality of wireless devices and the determination is based at least partially on a reward function shared between the wireless devices in the plurality of wireless devices; and instructing the first wireless device to roam from the first wireless access point to the second wireless access point, based on the determination.

7. The method as in claim 6, wherein the first reinforcement learning agent implements a Q-learning method.

8. The method as in claim 7, wherein the method further comprises the first reinforcement learning agent updating a central Q-table based on actions performed by the plurality of wireless devices.

9. A method performed by a node of a wireless communications network, the method comprising:

allocating a parameter indicative of a reward according to a first reward function to a first reinforcement learning agent based on an action determined by the first reinforcement learning agent, the action comprising providing an instruction to a first wireless device served by a first wireless access point in a first wireless communications network operated by a first network operator, the instruction instructing the first wireless device to roam from the first wireless access point to a second wireless access point in a second wireless communications network operated by a second network operator; and allocating a parameter indicative of the reward to a second wireless device using the first reward function.

10. The method as in claim 9, wherein the first wireless device and the second wireless device are both part of a first group of wireless devices.

11. The method as in claim 10, wherein the wireless devices in the first group of wireless devices have at least one common connection parameter.

12. The method as in claim 9 further comprising:
allocating a parameter indicative of a reward to a third reinforcement learning agent based on an action determined by the third reinforcement learning agent for a third wireless device, wherein the third wireless device is part of a second group of wireless devices and wherein the step of allocating a parameter indicative of a reward to a third reinforcement learning agent comprises:
allocating a parameter indicative of a reward using a second reward function, the second reward function being different to the first reward function.

13. A first wireless device, the first wireless device being connected to a first wireless access point in a first wireless communications network, the first wireless communications network being operated by a first network operator, the first wireless device comprising a processor and a memory, said memory containing instructions executable by said processor whereby said first wireless device is operative to:
acquire a determination from a first reinforcement learning agent of whether to roam from the first wireless access point to a second wireless access point in a second wireless communications network, the second wireless communications network being operated by a second network operator, wherein the determination is based at least partially on a reward function that is also shared from the first reinforcement learning agent to a second reinforcement learning agent that is associated with a second wireless device; and
roam from the first wireless access point to the second wireless access point, based on the determination.

14. A node in a wireless communications network, the node comprising a processor and a memory, said memory containing instructions executable by said processor whereby said node is operative to:
acquire a determination from a first reinforcement learning agent of whether a first wireless device served by a first wireless access point in a first wireless communications network operated by a first network operator should roam from the first wireless access point to a second wireless access point in a second wireless communications network operated by a second network operator, wherein the first reinforcement learning agent is associated with a plurality of wireless devices and the determination is based at least partially on a reward function shared between the wireless devices in the plurality of wireless devices; and
instruct the first wireless device to roam from the first wireless access point to the second wireless access point, based on the determination.

15. The node as in claim 14, wherein the first reinforcement learning agent receives a parameter indicative of a negative reward when one or more of:
the first wireless device roams to the second wireless access point in the second network;
roaming to the second wireless access point decreases the connectivity of the first wireless device;
roaming leads to a loss of connectivity of the first wireless device; and
when an inter-network operator handover procedure is performed.

16. A node in a wireless communications network, the node comprising a processor and a memory, said memory containing instructions executable by said processor whereby said node is operative to:
allocate a parameter indicative of a reward according to a first reward function to a first reinforcement learning agent based on an action determined by the first reinforcement learning agent, the action comprising providing an instruction to a first wireless device served by a first wireless access point in a first wireless communications network operated by a first network operator, the instruction instructing the first wireless device to roam from the first wireless access point to a second wireless access point in a second wireless communications network operated by a second network operator; and
allocating a parameter indicative of the reward to a second wireless device using the first reward function.

17. The node as in claim 16, wherein the first reinforcement learning agent implements a Q-learning method.

* * * * *